(12) United States Patent
Kadowaki et al.

(10) Patent No.: US 8,205,704 B2
(45) Date of Patent: Jun. 26, 2012

(54) PARKING ASSIST APPARATUS (75) Inventors: Jun Kadowaki, Kariya (JP); Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 339 days.

(21) Appl. No.: 12/705,809

(22) Filed: Feb. 15, 2010

(65) Prior Publication Data

US 2010/0219010 A1 Sep. 2, 2010

(30) Foreign Application Priority Data

Mar. 2, 2009 (JP) ................................ 2009-048417

(51) Int. Cl.
*B60Q 1/48* (2006.01)
*B62D 6/00* (2006.01)
*G06F 7/00* (2006.01)

(52) U.S. Cl. ..................... 180/204; 180/199; 340/932.2; 701/36; 701/41; 701/42

(58) Field of Classification Search .................. 180/199, 180/204; 340/932.2; 701/41, 42
See application file for complete search history.

(56) References Cited

U.S. PATENT DOCUMENTS

| | | | | |
|---|---|---|---|---|
| 6,611,744 B1 * | 8/2003 | Shimazaki et al. | ............. | 701/41 |
| 7,053,794 B2 * | 5/2006 | Tanaka et al. | ............. | 340/932.2 |
| 7,099,758 B2 * | 8/2006 | Tanaka et al. | ............. | 701/36 |
| 7,127,339 B2 * | 10/2006 | Iwazaki et al. | ............. | 701/36 |
| 7,487,020 B2 * | 2/2009 | Iwazaki et al. | ............. | 701/41 |
| 7,640,108 B2 * | 12/2009 | Shimizu et al. | ............. | 701/301 |
| 8,085,167 B2 * | 12/2011 | Tanaka et al. | ............. | 340/932.2 |
| 2009/0303080 A1 * | 12/2009 | Kadowaki et al. | ......... | 340/932.2 |

FOREIGN PATENT DOCUMENTS

| | | |
|---|---|---|
| JP | 2003-237511 A | 8/2003 |
| JP | 2008-284969 A | 11/2008 |

* cited by examiner

*Primary Examiner* — Tony H. Winner
*Assistant Examiner* — Marc Scharich
(74) *Attorney, Agent, or Firm* — Sughrue Mion, PLLC (57) ABSTRACT A parking assist apparatus includes a guidance mode setting portion specifying a forward turning guidance controlling portion to perform a control when determining that a direct guidance control for driving a vehicle rearward to a target parking position without once driving the vehicle forward is unachievable. The forward turning guidance controlling portion includes an auxiliary guidance controlling device generating an auxiliary guidance path and driving the vehicle rearward by an automatic steering along the auxiliary guidance path and a guidance possibility determining device determining whether or not the vehicle is directly guided rearward to the target parking position based on a position and a steering angle of the vehicle while the vehicle is moving forward by a manual steering. The forward turning guidance controlling portion includes a final guidance controlling device guiding the vehicle to the target parking position.

11 Claims, 8 Drawing Sheets

PARKING ASSIST APPARATUS

CROSS REFERENCE TO RELATED APPLICATIONS

This application is based on and claims priority under 35 U.S.C. §119 to Japanese Patent Application 2009-048417, filed on Mar. 2, 2009, the entire content of which is incorporated herein by reference.

TECHNICAL FIELD

This disclosure relates to a parking assist apparatus. More particularly, the disclosure pertains to a parking assist apparatus for guiding a vehicle rearward to a target parking position based on a relationship between a stop position of the vehicle and the target parking position previously specified.

BACKGROUND DISCUSSION

A known parking assist apparatus is disclosed in JP2003-237511A (hereinafter referred to as Reference 1). According to the parking assist apparatus disclosed in Reference 1, while a vehicle is being guided to move rearward from a stop position to a target parking position, the vehicle is driven once away from the target parking position, i.e., the vehicle moves forward. Specifically, in a case where it is impossible to establish a driving path to the target parking position even with a maximum steering angle of the vehicle from the stop position, a driving path to a first target position located in the vicinity of the target parking position is established. Then, the vehicle is guided rearward along the driving path to stop at the first target position. Next, a driving path to a second target position to which the vehicle is guided to move forward is established. The vehicle is guided forward along the driving path to the second target position. In a state where the vehicle reaches the second target position, the vehicle is highly possibly guided to the target parking position directly from the second target position.

In addition, JP2008-284969A (hereinafter referred to as Reference 2) discloses a parking assist apparatus in which a vehicle is stopped at a position where a parking space can be confirmed (i.e., a tentative stop position) and where a parking assist is started by an operation of a switch.

According to the parking assist apparatus disclosed in Reference 2, division lines marked on a road surface, and the like are obtained by an image data captured by a camera to thereby detect a parking space, which is determined as a target parking position. Next, a driving path calculating portion calculates a tentative driving path based on a tentative rearward movement start position of the vehicle so as to determine whether or not the vehicle reaches the target parking position. Such calculation is repeatedly conducted while the vehicle is moving forward from the tentative stop position. In a case where the driving path to the target parking position is established, an alarm output portion informs a driver of the establishment of the driving path via a speaker, and the like. When the driver stops the vehicle upon recognizing the output from the speaker and starts an operation to drive the vehicle rearward (i.e., shifts a shift lever to a reverse position), a guide portion guides the vehicle to the target parking position by an automatic steering by which a power steering unit is controlled so as to move the vehicle along the driving path.

In a case where the vehicle is guided rearward to a predetermined target parking position, depending on a relationship between the target parking position and the vehicle, a relationship between the target parking position and an orientation of the vehicle, and the like, the vehicle may not be directly guided to the target parking position. That is, the vehicle may be required to be driven rearward and forward before being guided to the target parking position.

Reference 1 discloses the parking assist control in which the vehicle is guided forward once before being guided to the target parking position (which is defined to be a forward turning).

In a case where the driving path is specified beforehand from the stop position of the vehicle to the target parking position as described in Reference 1, for example, the vehicle may not avoid an obstacle that exists on the path of the vehicle moving forward and therefore may hit the obstacle.

In addition, in a state where a parking space is defined to be adjacent to a relatively narrow road, in the similar situation as that where an obstacle is present, the forward turning may be necessary to achieve parking the vehicle. A technique for guiding the vehicle to the target parking position including the forward turning is desired accordingly.

According to the parking assist apparatus disclosed in Reference 2, the driving path for guiding the vehicle to the target parking position is repeatedly calculated while the vehicle is moving forward. As a result, the volume of information processing is large, which may lead to a certain apparatus having a high processing capacity. In addition, when comparing the parking assist apparatus disclosed in Reference 2 with the parking assist apparatus disclosed in Reference 1 in which the vehicle is guided along the driving path determined in the parking assist control, the driving path along which the vehicle is driven is relatively flexibly specified according to the parking assist apparatus in Reference 2. However, because the forward turning is not assumed in Reference 2, a forward moving distance of the vehicle may be longer when an initial stop position of the vehicle (i.e., the tentative stop position) is inappropriate.

A need thus exists for a parking assist apparatus which is not susceptible to the drawback mentioned above.

SUMMARY

According to an aspect of this disclosure, a parking assist apparatus includes a guidance mode setting portion specifying a forward turning guidance controlling portion to perform a control when determining, on a basis of a stop position of a vehicle and a positional relationship with a target parking position previously specified, that a direct guidance control for driving the vehicle rearward to the target parking position without once driving the vehicle forward is unachievable. The forward turning guidance controlling portion includes an auxiliary guidance controlling device performing a guidance control for driving the vehicle rearward from the stop position to approach the target parking position, the auxiliary guidance controlling device generating an auxiliary guidance path for guiding the vehicle to a position adjoined to the target parking position based on the stop position and the target parking position, the auxiliary guidance controlling device driving the vehicle rearward by an automatic steering along the auxiliary guidance path as the guidance control. The forward turning guidance controlling portion includes a guidance possibility determining device determining whether or not the vehicle is directly guided rearward to the target parking position based on a position and a steering angle of the vehicle while the vehicle is moving forward by a manual steering after the vehicle is stopped at the position adjoined to the target parking position, the guidance possibility determining device informing a driver of the vehicle when it is determined that a direct guidance of the vehicle to the target parking position is achievable. The forward turning guidance controlling portion includes a final guidance controlling device guiding the vehicle to the target parking position after the guidance possibility determining device informs the driver.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be explained with reference to the attached drawings. According to the embodiment, a parking assist apparatus for guiding a vehicle 30, which constitutes a passenger car, to a target parking area G serving as a target parking position by means of a guidance control including an automatic steering will be explained.

Figure 1:
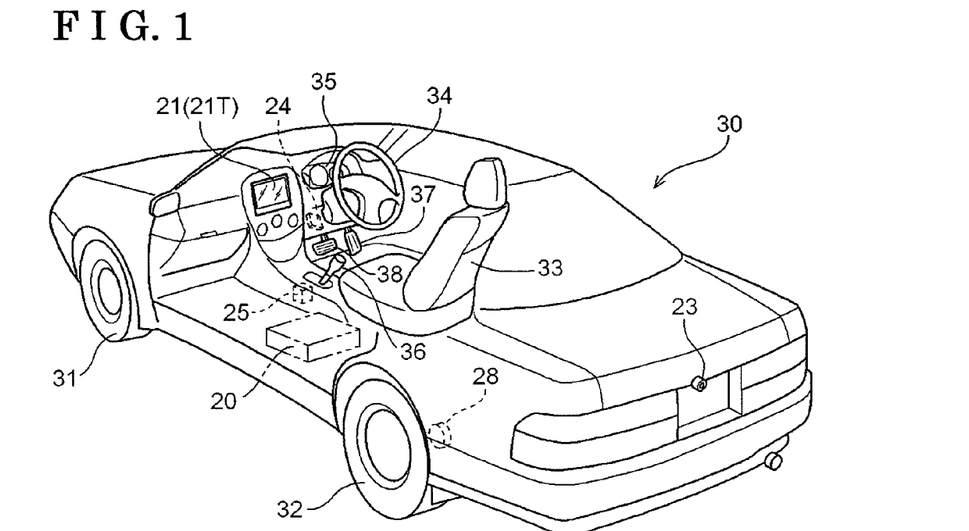
FIG. 1 is a perspective view illustrating a structure of a vehicle according to an embodiment disclosed here.
Figure 2:
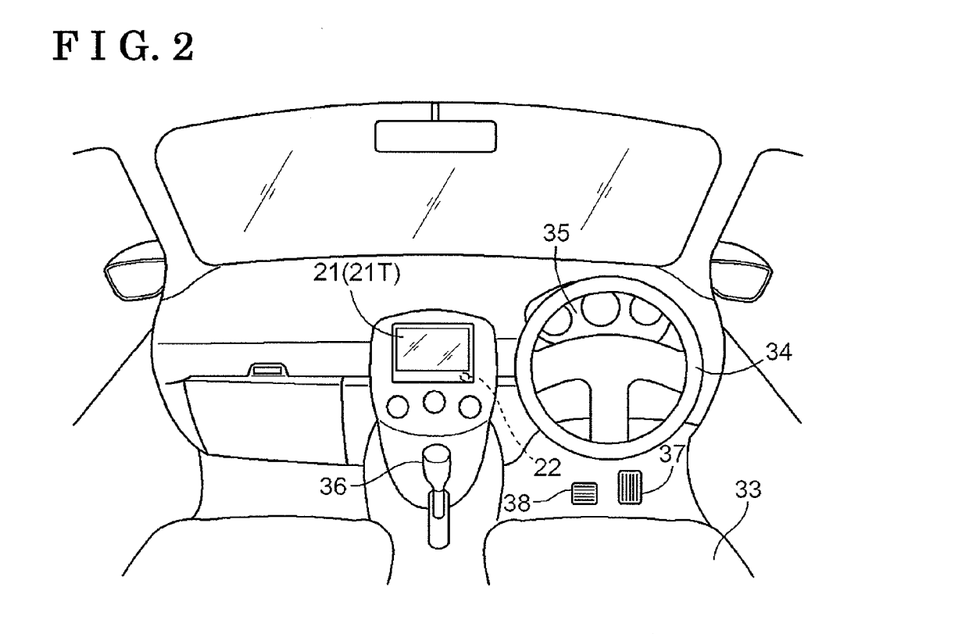
FIG. 2 is a perspective view illustrating a panel portion in an interior of the vehicle.
Figure 3:
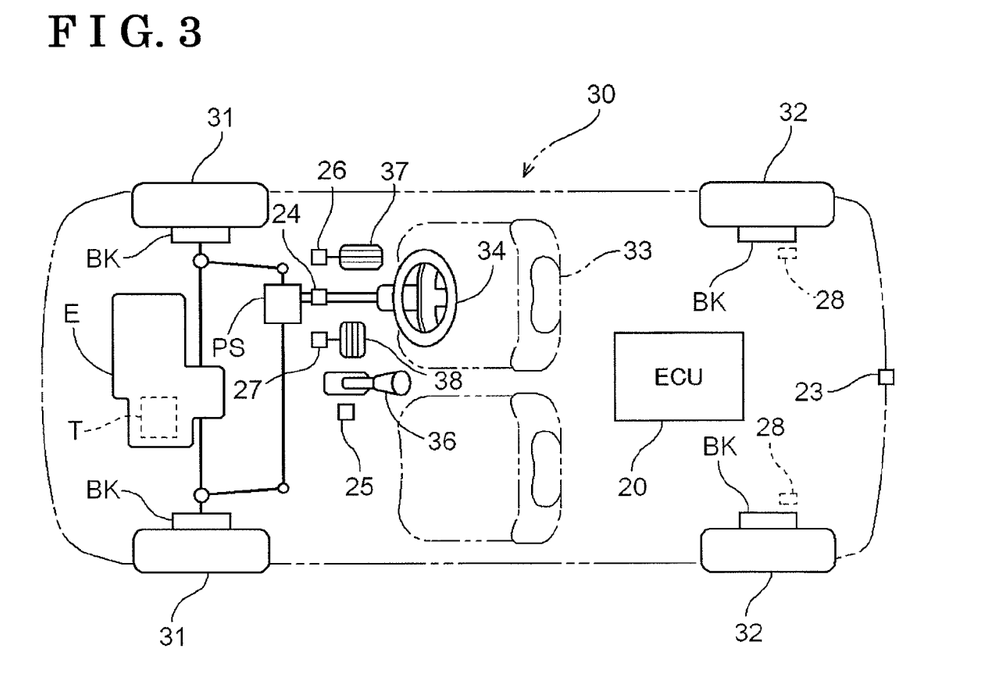
FIG. 3 is a plan view schematically illustrating the structure of the vehicle.

As illustrated in FIGS. 1 to 3, the vehicle 30 includes front wheels 31 and rear wheels 32. The vehicle 30 also includes, in its interior, a passenger seat 33, a steering wheel 34, a panel 35 provided in front of the steering wheel 34 and including various indicators, and a shift lever 36 provided at a side of the passenger seat 33 for shifting gears.

The steering wheel 34 is operated in conjunction with a power steering unit PS that transmits a rotational operation force to the front wheels 31 for a driving. An engine E and a transmission mechanism T that includes a torque converter, a continuously variable transmission (CVT), and the like and that transmits an output power (i.e., revolutions) of the engine E to the front wheels 31 are arranged at a front portion of the vehicle 30. An acceleration pedal 37 controlling a driving speed of the vehicle 30 and a brake pedal 38 applying a braking force on the front wheels 31 and the rear wheels 32 via brake apparatuses BK thereof are arranged side by side at a front of the passenger seat 33.

A display monitor 21 serving as a display device and including a touch panel 21T on a display surface is provided in the vicinity of the passenger seat 33, i.e., at an upper portion of a console. A liquid crystal display monitor with backlighting is applied to the display monitor 21. Alternatively, a plasma display monitor, a CRT (cathode-ray tube) display monitor, and the like may be applied to the display monitor 21. The touch panel 21T serves as a pressure-sensitive or electrostatic instruction input device that outputs location data based on a position touched by a finger, for example. A speaker 22 is also provided at the display monitor 21. Alternatively, the speaker 22 may be provided at the other portion, such as an interior side of a door, and the like. According to the present embodiment, the display monitor 21 is also used as a display device for a navigation system but may be used as an exclusive display device for the parking assist.

According to the present embodiment, a camera 23 is provided at a rear edge of the vehicle 30 so as to serve as an image-capturing device capturing an image of an area around the vehicle 30. The camera 23 is a digital camera incorporating a CCD (charge coupled device) image sensor, a CMOS (complementary metal oxide semiconductor) image sensor (CIS), or the like. The camera 23 outputs the captured information as a moving image in real time. The camera 23 includes a wide-angle lens to thereby ensure 120 to 140 degrees of field of view in a horizontal direction. In addition, the camera 23 is positioned, having approximately 30 degrees of an angle of depression to thereby capture an image of an area up to approximately 8 meters in the rear of the vehicle 30.

The vehicle 30 is equipped with various sensors for detecting a driving operation, a moving state, and the like of the vehicle 30. Specifically, the vehicle 30 includes a steering sensor 24 in connection with an operation of the steering wheel 34, a shift position sensor 25 in connection with an operation of the shift lever 36, an acceleration sensor 26 in connection with an operation of the acceleration pedal 37, and a brake sensor 27 in connection with an operation of the brake pedal 38. The steering sensor 24 measures a steering direction and a steering operation variable (steering amount). The shift position sensor 25 determines a shift position of the shift lever 36. The acceleration sensor 26 measures an operation variable of the acceleration pedal 37. The brake sensor 27 detects whether or not the brake pedal 38 is depressed.

Moving distance sensors 28 measuring a moving distance of the vehicle 30 based on rotations of the rear wheels 32 are arranged in the vicinity of the respective rear wheels 32. The moving distance sensors 28 may obtain the moving distance of the vehicle 30 based on a rotation of a rotational member provided at the transmission mechanism T. In addition, the moving distance sensors 28 may measure rotations of the respective front wheels 31. Further, a photo interrupter sensor, a pick-up sensor, or the like may be used as the moving distance sensor 28.

Figure 4:
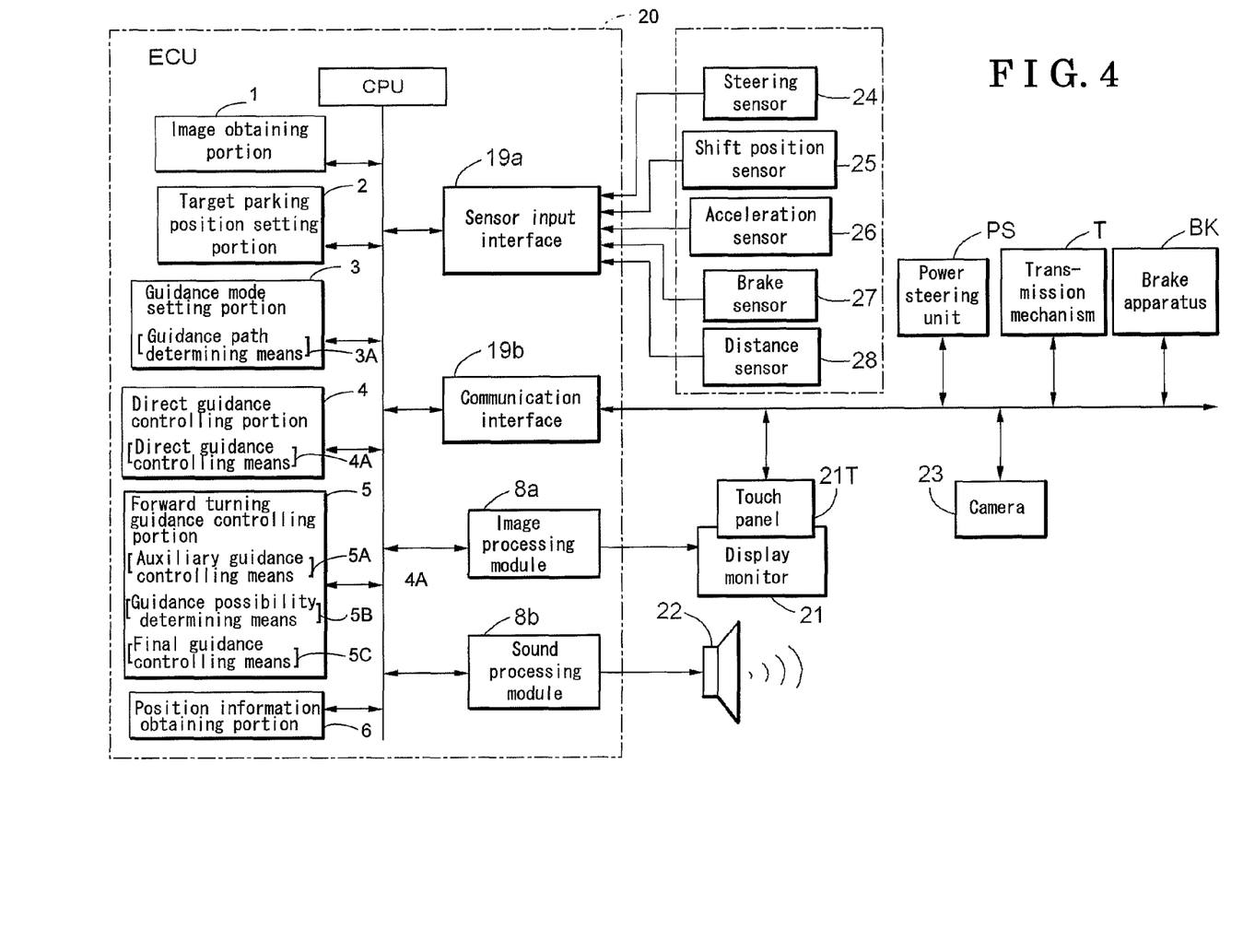
FIG. 4 is a block diagram of a control system of the vehicle.

An ECU (electronic control unit) 20 serving as a core of the parking assist apparatus of the present embodiment is provided at substantially a center of the vehicle 30. As illustrated in FIG. 4, the ECU 20 includes an interface constituted by a sensor input interface 19a and a communication interface 19b for inputting and outputting information, a microprocessor that processes information obtained by the interface, a digital signal processor (DSP), and the like. The interface may be partially or fully incorporated within such processors. The ECU 20 is constituted by an electronic circuit having the processor as a core member. The ECU 20 also includes a storage portion constituted by a memory, a register, and the like incorporated in the processor or mounted as a separate part.

The sensor input interface 19a obtains information from various sensors such as the steering sensor 24 that detects the driving operation, the moving state, and the like, while the communication interface 19b communicates with the touch panel 21T, the camera 23, the power steering unit PS, the transmission mechanism T, and the brake apparatuses BK. An image is output on the display monitor 21 by means of an image processing module 8a while a sound is output from the speaker 22 by means of a sound processing module 8b.

As illustrated in FIG. 4, the parking assist apparatus of the present embodiment includes a portion obtaining a signal by means of the sensor input interface 19a, a portion obtaining a signal for accessing information by means of the communication interface 19b, the image processing module 8a, and the sound processing module 8b. In addition, the parking assist apparatus includes an image obtaining portion 1, a target parking position setting portion 2, a guidance mode setting portion 3, a direct guidance controlling portion 4, a forward turning guidance controlling portion 5, and a position information obtaining portion 6. The aforementioned portions are connected to one another by means of data bus, address bus, control bus, and the like inside or outside of the microprocessor, for example.

The image obtaining portion 1, the target parking position setting portion 2, the guidance mode setting portion 3, the direct guidance controlling portion 4, the forward turning guidance controlling portion 5, the position information obtaining portion 6, the image processing module 8a, and the sound processing module 8b are each constituted by software. Alternatively, for example, each of the portions may be constituted by a combination of software and hardware, or by hardware only.

The image obtaining portion 1 obtains data of images captured by the camera 23. The target parking position setting portion 2 detects, on the basis of the image data obtained by the image obtaining portion 1, a stop position of the vehicle 30 as a base used when the vehicle 30 is parked. The target parking position setting portion 2 also specifies, on the basis of the stop position of the vehicle 30, the target parking area G serving as the target parking position by means of an automatic processing and a manual operation by a driver of the vehicle 30. That is, a position (area) having a predetermined positional relationship with the stop position of the vehicle 30 is specified as the target parking position. According to the present embodiment, an area sandwiched by two division lines W (parking division lines) marked on a road surface is specified as the target parking area G.

The guidance mode setting portion 3 includes a guidance path determining means 3A serving as a guidance path determining device that determines whether or not a direct guidance control is achievable. According to the direct guidance control, the vehicle 30 is driven rearward and is directly guided to the target parking area G from the stop position without a forward turning operation (i.e., without the vehicle to be driven forward so as to be once away from the target parking position). Specifically, the guidance path determining means 3A determines the possibility of the direct guidance control based on a positional relationship between the stop position of the vehicle 30 and the target parking area G (target parking position), and an orientation of the vehicle 30 in the stop position. In a case where the guidance path determining means 3A determines that the direct guidance control is achievable, the direct guidance control is specified. On the other hand, in a case where the guidance path determining means 3A determines that the direct guidance control is not achievable, a forward turning guidance control is specified so as to guide the vehicle 30 from the stop position to the target parking area G by the use of the forward turning operation. That is, the vehicle 30 is guided to the target parking area G by a rearward movement, a forward movement, and another rearward movement.

The guidance path determining means 3A performs a process for estimating multiple virtual guidance paths, based on the present stop position of the vehicle 30 and the target parking position previously specified, so as to move the vehicle 30 rearward and guide the vehicle 30 to the target parking area G. The steering angle and steering timing differ depending on the virtual guidance paths. In a case where the vehicle 30 can be guided in a state where the vehicle 30 is prevented from passing through a position where the body of the vehicle 30 overlaps one of the division lines W (see FIGS. 5 and 6) by following one of the multiple virtual guidance paths, a direct guidance path is generated from that virtual guidance path and the guidance path determining means 3A specifies the direct guidance control. On the other hand, in a case where the vehicle 30 inevitably passes through the position where the body of the vehicle 30 overlaps one of the two division lines W by following any of the virtual guidance paths, the guidance path determining means 3A specifies the forward turning guidance control.

The direct guidance controlling portion 4 includes a direct guidance controlling means 4A serving as a direct guidance controlling device that generates the direct guidance path. The forward turning guidance controlling portion 5 includes an auxiliary guidance controlling means 5A serving as an auxiliary guidance controlling device, a guidance possibility determining means 5B serving as a guidance possibility determining device, and a final guidance controlling means 5C serving as a final guidance controlling device to thereby achieve the forward turning guidance control.

Figure 5:
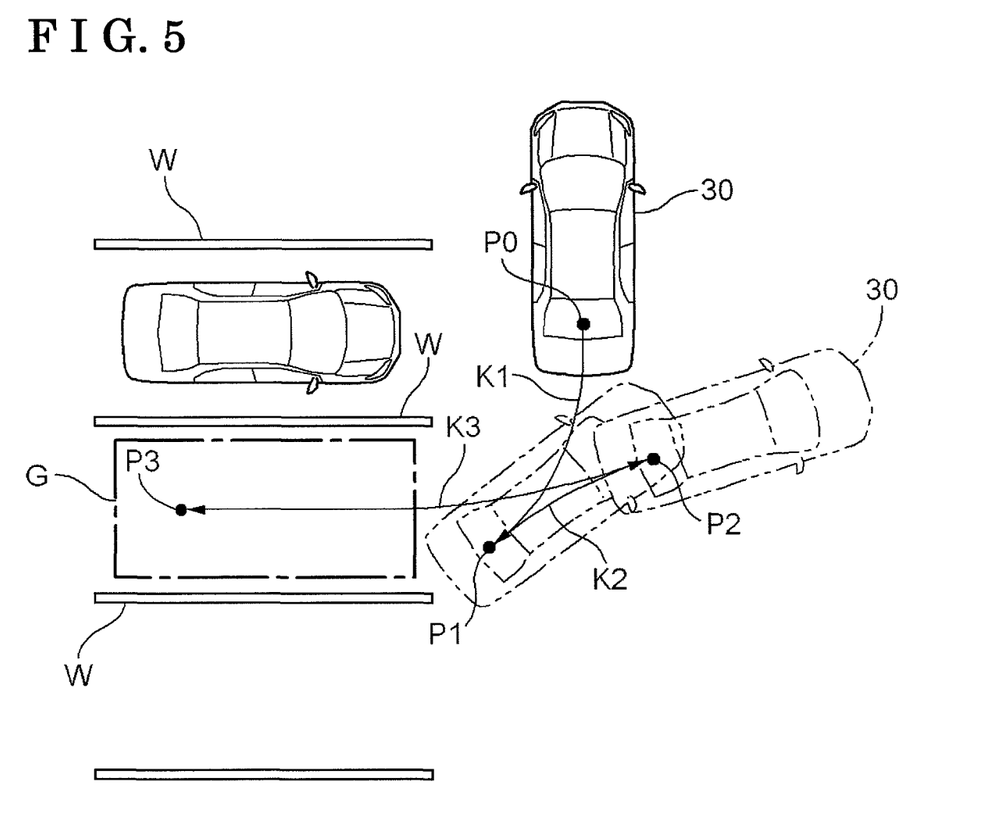
FIG. 5 is a plan view illustrating a guide path, and the like of the vehicle by a forward turning control.
Figure 6:
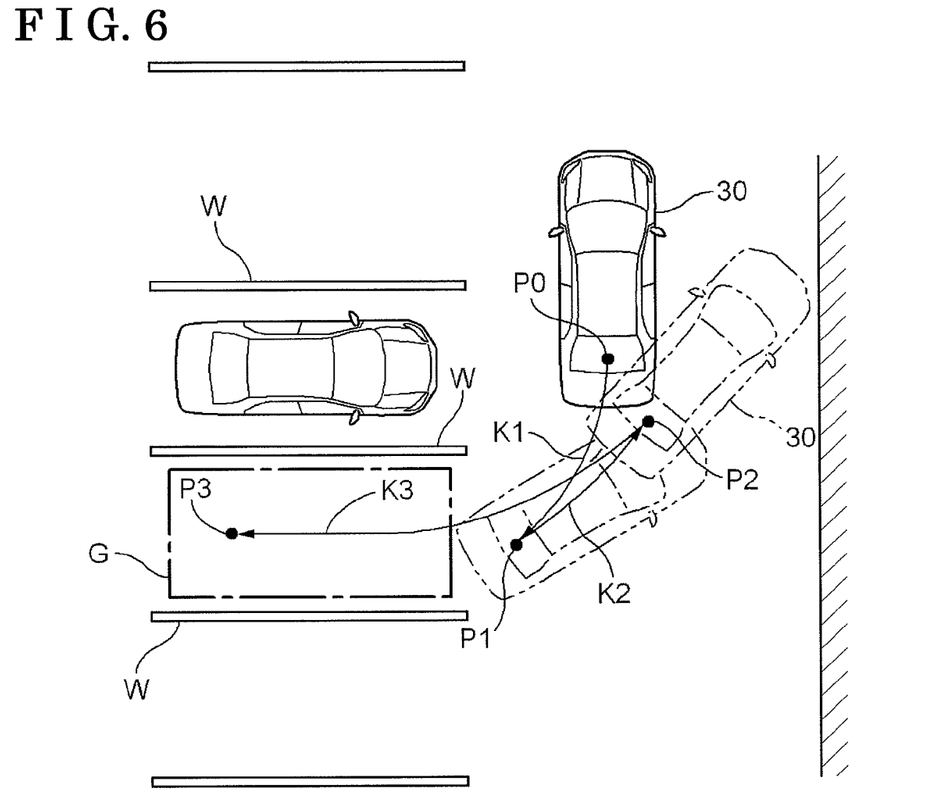
FIG. 6 is another plan view illustrating the guide path, and the like of the vehicle by the forward turning control.

In the forward turning guidance control, as illustrated in FIGS. 5 and 6, an auxiliary guidance path K1 is generated by the auxiliary guidance controlling means 5A so as to guide the vehicle 30 to move rearward to a position adjoined to the target parking area G. At this time, an auxiliary target position P1 where the vehicle 30 guided along the auxiliary guidance path K1 is stopped is specified in the vicinity of the target parking area G. The auxiliary target position P1 is not a point simply close to the target parking area G but a point at which the vehicle 30 partially enters the target parking area G in a planar view.

After the vehicle 30 is driven along the auxiliary guidance path K1 by the guidance control, the vehicle 30 can be driven forward by a manual steering operation of the driver. A path along which the vehicle 30 moves forward by the manual steering is defined as a forward turning path K2. The guidance possibility determining means 5B determines, while the vehicle 30 is moving forward along the forward turning path K2, whether or not the vehicle 30 can be guided to the target parking area G.

In a case where the vehicle 30 reaches and stops at a position where the vehicle 30 can be guided to the target parking area G by means of the guidance possibility determining means 5B, the final guidance controlling means 5C generates a final guidance path K3 for driving the vehicle 30 rearward from the aforementioned stop position so that the vehicle 30 is guided to the target parking area G. Consequently, the vehicle 30 is guided to the target parking area G by the guidance control along the final guidance path K3.

In addition, in a case where the guidance control is performed by the direct guidance controlling portion 4 or the forward turning guidance controlling portion 5, the vehicle 30 is driven rearward by the guidance control so as to follow any one of the direct guidance path, the auxiliary guidance path, and the final guidance path while the position information obtaining portion 6 is obtaining information. According to the guidance control, information obtained by the position information obtaining portion 6 is fed back so as to correct the position of the vehicle 30, the moving direction thereof, and the like.

The guidance control includes not only a control for moving the vehicle 30 along a predetermined path by the automatic steering but also a control for displaying a steering direction, a steering amount, and the like on the display monitor 21 and or for audibly outputting the steering direction, the steering amount, and the like from the speaker 22.

Each of the guidance paths can be regarded not only as information of coordinates indicating the path but also as information indicating a target orientation of the vehicle 30 at each point on the path, and as information of a structure in which target steering amounts at respective points on the path are related to each other. Therefore, according to the guidance control, the power steering unit PS is controlled on the basis of such information so as to move the vehicle 30 by the automatic steering and information such as the steering direction is output via the display monitor 21 and/or the speaker 22.

The position information obtaining portion 6 obtains the present position of the vehicle 30 required for guiding the vehicle 30, and the position of the target parking area G relative to the vehicle 30 while the vehicle 30 is moving. That is, the position information obtaining portion 6 performs a vehicle position detecting operation for detecting a position information of the vehicle 30 that varies depending on the movement of the vehicle 30 and a target parking position detecting operation for detecting a positional relationship relative to the target parking area G that varies depending on the movement of the vehicle 30. Such operations are conducted on the basis of an image data captured by the camera 23, a moving distance of the vehicle 30 obtained by the moving distance sensor 28, and a steering amount of the steering wheel 34 measured by the steering sensor 24.

The parking assist apparatus according to the present embodiment achieves the parking assist control by means of the direct guidance control and the forward turning guidance control. The vehicle 30 is driven rearward by the automatic steering, and, when the forward turning operation is necessary, the vehicle 30 is driven forward by the manual steering by the driver. The vehicle 30 is eventually driven rearward by the automatic steering so that the vehicle 30 is guided to the target parking area G serving as the target parking position.

In order to explain in details the parking assist control by the parking assist apparatus, an intermediate position between the rear wheels 32 of the vehicle 30 in the planar view as illustrated in FIGS. 5 and 6 is defined as a control base point. Then, the control base point obtained when the vehicle 30 is stopped on each of the guidance paths is referred to as a guidance point P (i.e., a collective term of P0 to P3 which will be explained later). In FIGS. 5 and 6, an outline of the body of the vehicle 30 at the guidance point P is illustrated by a virtual line, and the like. The guidance control is realized by the vehicle 30 that moves along the guidance path so that the vehicle 30 is guided to the target parking area G without passing through the position where the body of the vehicle 30 overlaps the division line W.

According to the parking assist apparatus of the present embodiment, the vehicle 30 is stopped in the vicinity of an area where a parking space specified to be the target parking area G (target parking position) is present. Then, the parking assist is started at a time when a driver of the vehicle 30 specifies the target parking area G at the position where the vehicle 30 is stopped so that the direct guidance control or the forward turning guidance control is achievable.

Figure 12:
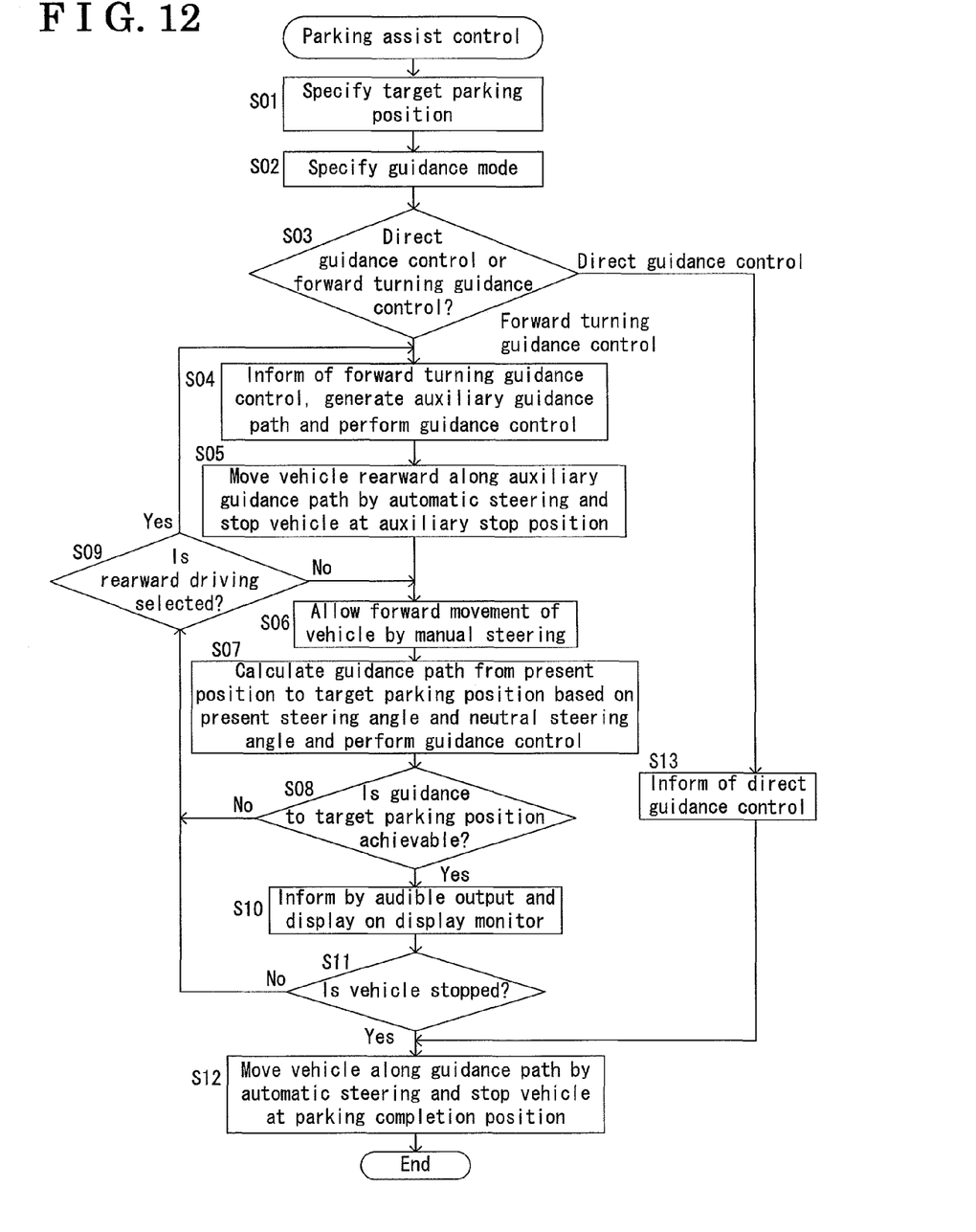
FIG. 12 is a flowchart illustrating a parking assist control.

Details of the parking assist control are illustrated in a flowchart in FIG. 12. The guidance paths generated when the vehicle 30 is guided to the target parking area G by means of the forward turning guidance control are illustrated in FIGS. 5 and 6. In each of the guidance paths, the stop position of the vehicle 30 is defined to be a control start position P0. A close position to the target parking area G is defined to be an auxiliary target position P1. A position where the vehicle 30 is stopped after being driven forward by means of the forward turning operation is defined to be a forward movement stop position P2. A target stop position in the target parking area G from the forward movement stop position P2 is defined to be a parking completion position P3.

Further, the path for guiding the vehicle 30 from the control start position P0 to the auxiliary target position P1 is defined to be the auxiliary guidance path K1. The path from the auxiliary target position P1 to the forward movement stop position P2 is defined to be the forward turning path K2. The path for guiding the vehicle 30 from the forward movement stop position P2 to the parking completion position P3 is defined to be the final guidance path K3.

As illustrate in FIG. 12, in a case where a rearward parking such as parking in a garage is performed by the parking assist control, for example, the driver stops the vehicle 30 at a position in the vicinity of a parking space. Then, in a state where the driver shifts the shift lever 36 to the reverse range (R), the parking space is specified as the target parking area G (target parking position) in S01. Consequently, the guidance mode for guiding the vehicle 30 to move rearward to the target parking area G is determined on the basis of the stop position of the vehicle 30, the orientation thereof, and the target parking area G in S02.

Figure 7:
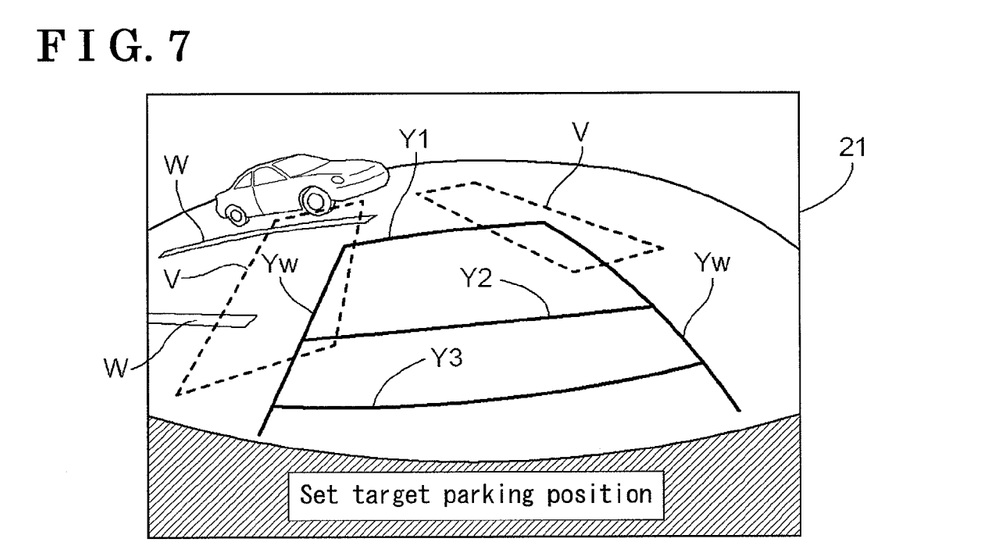
FIG. 7 is a diagram illustrating a monitor display when setting of a target parking position is started.

The operation for shifting the shift lever 36 to the reverse range (R) is a trigger for starting the parking assist control and a display of the image captured by the camera 23 on the display monitor 21. At a time when the driver specifies the target parking area G, the target parking position setting portion 2 displays the image captured by the camera 23 on the display monitor 21 as illustrated in FIG. 7. On the display monitor 21, left and right vehicle width lines Yw and a guide indicator constituted by expected course lines Y1, Y2, and Y3 of the vehicle 30 corresponding to 5 meters, 3 meters, and 1 meter, respectively, from the rear end of the vehicle 30 are displayed in a superimposed manner on the image of the area in the vicinity of the rear of the vehicle 30 captured by the camera 23. In addition, left and right focus areas V, each having a frame shape, are displayed on the display monitor 21. Further, a message such as "set target parking position" is displayed (at this time, alternatively, the message may be audibly output). The screen image on the display monitor 21 appears in such a manner that a left and right direction is reversed relative to the actual situation. That is, the screen image on the display monitor 21 is the same as a reflection of a picture in a room mirror of the vehicle 30.

Figure 8:
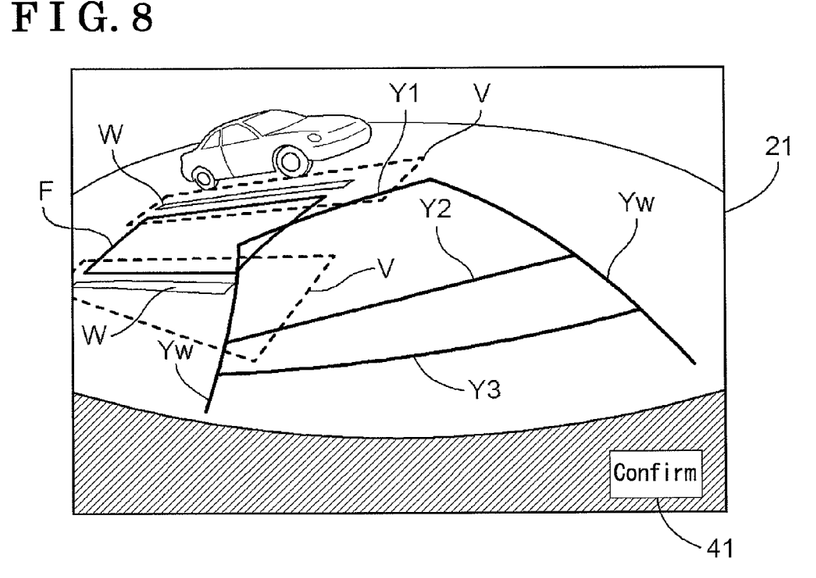
FIG. 8 is a diagram illustrating the monitor display when setting of the target parking position is completed.

In the aforementioned display state of the display monitor 21, the focus areas V move by a distance corresponding to the operation of the steering wheel 34. In a case where the focus areas V reach positions overlapping the respective division lines W as illustrated in FIG. 8 while the steering wheel 34 is being operated, the target parking position setting portion 2 displays a frame-like area F at an area sandwiched by the division lines W. When a position, at which the frame-like area F is displayed, corresponds to the desired target parking area G, the present position of the frame-like area F is stored as the target parking area G by means of a pressing of a confirmation button 41 by the driver.

The operation for specifying the frame-like area F is not limited to the aforementioned manner. For example, the frame-like area F displayed on the display monitor 21 may move by an operation of a switch, and the like via the touch panel 21T by the driver.

When the target parking area G is determined in the aforementioned manner, the target parking position setting portion 2 obtains a road surface position indicated by the frame-like area F displayed on the display monitor 21, a position of the vehicle 30 in a stopped state, and an orientation of the vehicle 30 as information of a two-dimensional coordinate system. Then, information indicating the positional relationship between the stop position of the vehicle 30 and the target parking area G is stored in the storage portion of the ECU 20 as information quantified in the two-dimensional coordinate system.

The operation for specifying the guidance mode in S02 is achieved by the guidance path determining means 3A of the guidance mode setting portion 3. That is, the guidance path determining means 3A estimates multiple virtual guidance paths such as the guidance paths K1, K2, and K3 for driving the vehicle 30 rearward from the control start position P0 (stop position) to the target parking area G based on the two-dimensional coordinate system indicating the relationship between the vehicle 30 and the target parking area G. Each of the thus estimated multiple virtual guidance paths includes a data structure in which the steering angle and the steering timing are in combination with each other. In a case where the vehicle 30 is guided to the target parking area G without passing through the position where the body of the vehicle 30 overlaps the division line W by following one of the virtual guidance paths, the guidance path determining means 3A specifies the direct guidance control.

On the other hand, in a case where the vehicle 30 inevitably passes through the position where the body of the vehicle 30 overlaps the division line W by following any of the multiple virtual guidance paths for moving the vehicle 30 rearward from the control start position P0 (stop position) to the target parking area G, the guidance path determining means 3A specifies the forward turning guidance control.

When the forward turning guidance control is specified, the auxiliary guidance path K1 and the auxiliary target position P1 are specified so as to move the vehicle 30 rearward along the auxiliary guidance path K1 by the automatic steering. In addition, the driver is informed that the forward turning guidance control is selected via the display on the display monitor 21 and/or the audible output from the speaker 22 (S03, S04, and S05).

In the forward turning guidance control, the auxiliary guidance controlling means 5A of the forward turning guidance controlling portion 5 specifies the auxiliary guidance path K1 and the auxiliary target position P1 so that the vehicle 30 moves rearward along the auxiliary guidance path K1 by the automatic steering.

The guidance control by the auxiliary guidance controlling means 5A includes not only the automatic steering. As mentioned above, the guidance control may also include the display of the path indicating the moving direction of the vehicle 30, the steering direction and the steering amount on the display monitor 21, the audible output via the speaker 22 of the steering direction, the steering amount, and the like.

Figure 9:
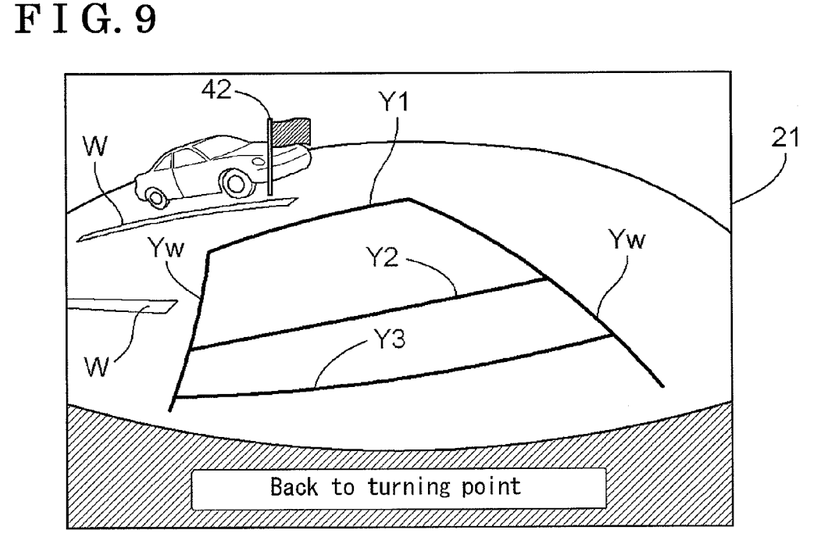
FIG. 9 is a diagram illustrating the monitor display when the vehicle is guided rearward along an auxiliary guide path.

At a time where the driver intends to move the vehicle 30 rearward, as illustrated in FIG. 9, a pole 42 showing a position where the driver of the vehicle 30 should turn the steering wheel 34 so as to move the vehicle 30 forward (i.e., a turning point corresponding to the auxiliary target position P1) is indicated on the display monitor 21. At the same time, a message "drive back to turning point" is indicated on the display monitor 21 and is output audibly via the speaker 22.

Figure 10:
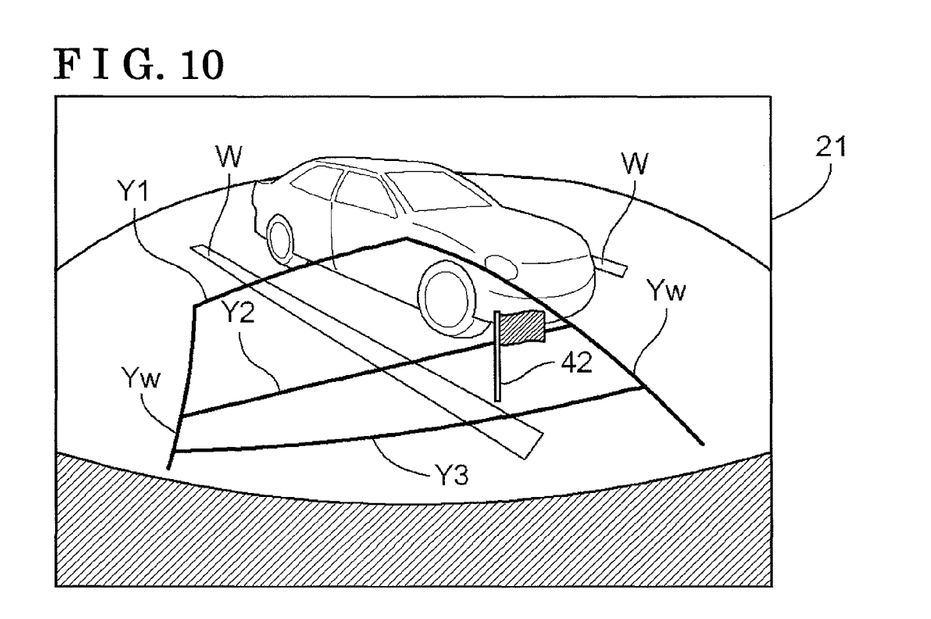
FIG. 10 is a diagram illustrating the monitor display when the vehicle reaches an auxiliary target position.

Following the aforementioned message, the driver releases the depression of the brake pedal 38 to thereby move the vehicle 30 along the auxiliary guidance path K1 by the automatic steering. When the expected course line Y3 of the guide indicator displayed on the display monitor 21 approaches, being positioned near the pole 42 as illustrated in FIG. 10 by the rearward movement of the vehicle 30, the driver operates the brake pedal 38 to stop the rearward movement of the vehicle 30. In a case where the vehicle 30 is guided rearward along the auxiliary guidance path K1 in the forward turning control, the frame-like area F is not indicated in addition to the target parking area G on the display monitor 21. This is to avoid a false recognition by the driver that the vehicle 30 can be directly guided to the target parking area G, which may be caused by a case where the frame-like area F is indicated.

After the vehicle 30 is stopped at the auxiliary target position P1, the driver shifts the shift lever 36 to the forward range so as to start the forward turning guidance control in S06 to S09.

In the aforementioned forward turning guidance control, the vehicle 30 moves forward by the driver manually operating the steering wheel 34. That is, the steering direction, the steering amount, and the like are not instructed to the driver. However, the guidance possibility determining means 5B determines, on the basis of the present position and the present steering angle of the vehicle 30 while the vehicle 30 is moving forward, whether or not the vehicle 30 is directly guided to the target parking area G (target parking position) by the rearward movement. Then, in a case where the guidance possibility determining means 5B determines that the vehicle 30 is directly guided to the target parking area G, the driver is informed of the capability of the direct guidance to the target parking area G in S10.

As the forward turning path K2 for driving the vehicle 30 forward, examples are shown in FIGS. 5 and 6. In FIG. 5, the vehicle 30 is steered in a state where a sufficient space is present in the vicinity of the target parking area G. On the other hand, in FIG. 6, the vehicle 30 is steered in a state where an insufficient area is present in the vicinity of the target parking area G. That is, according to the present embodiment, the arbitral path is selectable by the driver as the forward turning path K2. For example, in a case where an obstacle, a dent, and the like are present in the vicinity of the target parking area G, the driver can drive the vehicle 30 along the path so as to avoid such obstacle.

In the forward movement of the vehicle 30, the guidance possibility determining means 5B obtains the steering angle of the steering wheel 34 via a predetermined sampling timing in addition to the present position of the vehicle 30 and the relative position of the vehicle 30 to the target parking area G as in the two-dimensional coordinate system. Further, the guidance possibility determining means 5B determines, on the basis of the present position of the vehicle 30, the present steering angle, two steering angles consisting of the present steering angle and a neutral steering angle (i.e., a steering angle for driving the vehicle in a straight line and serving as a predetermined steering angle) derived from sampling results, whether or not the final guidance path K3 to the target parking area G can be generated when the vehicle 30 is driven rearward with the two steering angles from the present position. In a case where it is determined that the final guidance path K3 is generated, the final guidance controlling means 5C specifies the final guidance path K3.

In a case where it is determined that the final guidance path K3 is generated on the basis of the neutral steering angle and at that time the vehicle 30 is stopped with the steering angle other than the neutral steering angle, the steering angle of the vehicle 30 is adjusted to the neutral steering angle in the early stage of moving the vehicle 30 along the final guidance path K3.

In the determination of the possibility of generation of the final guidance path K3, in the same way as the operation by the guidance path determining means 3A, the guidance paths generated in a case where the vehicle 30 moves rearward with the present steering angle and the neutral steering angle, respectively, are estimated so that the vehicle 30 is guided rearward to the target parking area G. Then, in a case where the vehicle 30 is prevented from passing through the position where the body of the vehicle 30 overlaps the division line W by following one of the estimated guidance paths, the message indicating that the vehicle 30 can be guided to the target parking area G is displayed on the display monitor 21. At the same time, the message is also output from the speaker 22.

When the final guidance path K3 is not established and thus the message is not output while the vehicle 30 is moving forward in the forward turning guidance control, the driver may stop the vehicle 30 at an appropriate position. Then, when the driver shifts the shift lever 36 to the reverse range (R) while the vehicle 30 is being stopped, the auxiliary guidance controlling means 5A again generates the auxiliary guidance path K1 based on the stop position of the vehicle 30 so that the rearward movement of the vehicle 30 is achievable by the automatic steering. Accordingly, the vehicle 30 is guided rearward along the auxiliary guidance path K1, which is again determined, and is stopped. Afterwards, the driver shifts the shift lever 36 to the forward range to thereby allow the forward movement of the vehicle 30 by the manual steering. When the vehicle 30 reaches a state where the vehicle 30 can be guided to the target parking area G while moving forward, the message is output.

Figure 11:
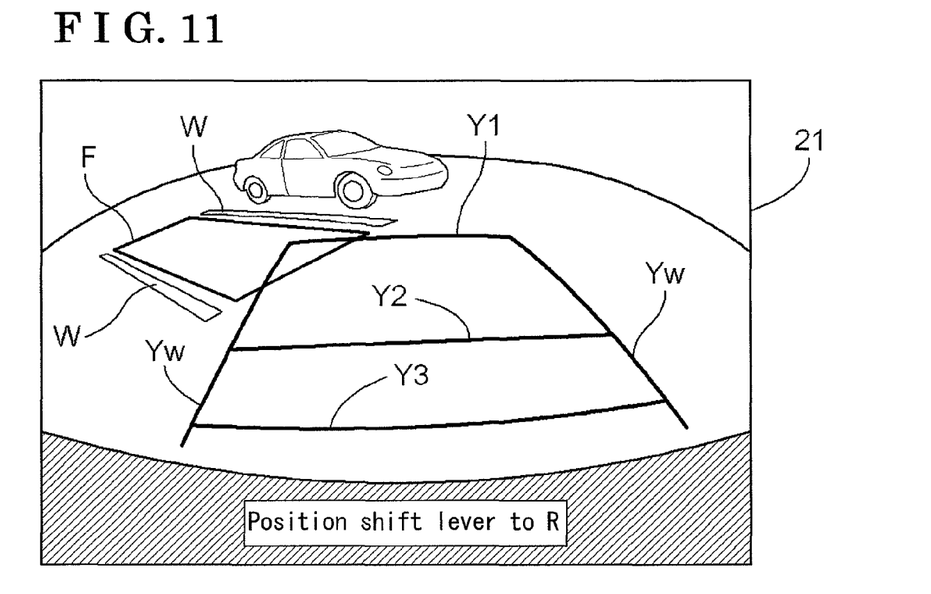
FIG. 11 is a diagram illustrating the monitor display when the vehicle is guided rearward along a final guide path.

When the message indicating that the vehicle 30 can be guided to the target parking area G and then the vehicle 30 is stopped, the final guidance controlling means 5C specifies the final guidance path K3. In such state, as illustrated in FIG. 11, a message "position shift lever to R" is displayed on the display monitor 21 and is also output via the speaker 22. As illustrated in FIG. 11, the frame-like area F is displayed on the display monitor 21 so that the driver can recognize that the vehicle 30 can be guided to the target parking area G by the rearward movement.

The driver then shifts the shift lever 36 to the reverse range (R) by following the aforementioned message and releases the depression of the brake pedal 38, so that the final guidance controlling means 5C controls the vehicle 30 to move along the final guidance path K3 by the automatic steering. Then, at a time when the vehicle 30 is guided to the parking completion position P3 in the target parking area G, the driver stops the vehicle 30 and shifts the shift lever 36 to the parking range. The parking assist is completed accordingly (S11 and S12).

The guidance control by the final guidance controlling means 5C includes not only the automatic steering but also the display of the path indicating the moving direction of the vehicle 30, the display of the steering direction and the steering amount on the display monitor 21, the audible output of the steering direction and the steering amount via the speaker 22, and the like.

In S03, when it is determined that the vehicle 30 located at the control start position P0 (stop position) can be guided to the parking completion position P3 in the target parking area G by the direct guidance control, the direct guidance controlling means 4A generates a direct guidance path after the operation in S03. In addition, the driver is informed that the direct guidance control is selected in S13. The operation in S12 is initiated where the driver shifts the shift lever 36 to the reverse range (R) and the vehicle 30 is driven rearward along the direct guidance path by the automatic steering to the parking completion position P3. The driver stops the vehicle 30 and shifts the shift lever 36 to the parking range, which leads to a completion of the parking assist.

The aforementioned direct guidance control includes not only the automatic steering but also the display of the path indicating the moving direction of the vehicle 30, the display of the steering direction and the steering amount on the display monitor 21, the audible output of the steering direction and the steering amount via the speaker 22, and the like.

According to the parking assist apparatus of the present embodiment, in a case where the vehicle 30 is parked in the vicinity of the parking space while the rearward parking such as parking in a garage is being performed and then the target parking area G is specified as the target parking position by means of the parking assist control, either the direct guidance control or the forward turning guidance control is automatically selected. When the direct guidance control is selected, the vehicle 30 is driven rearward by the automatic steering without the steering by the driver so as to be guided to the target parking area G.

In a case where the forward turning guidance control is selected, the control start position P0 and the auxiliary target position P1 are specified in addition to the auxiliary guidance path K1 along which the vehicle 30 is driven rearward by the automatic steering. Afterwards, the vehicle 30 is driven forward by the manual steering of the driver and is then stopped at a time when the message is output, thereby defining the forward movement stop position P2. The final guidance path K3 is generated for guiding the vehicle 30 to move rearward from the forward movement stop position P2 to the parking completion position P3. The vehicle 30 is driven rearward by the automatic steering along the final guidance path K3, thereby completing the parking of the vehicle 30.

Specifically, while the vehicle 30 is moving forward by the manual steering of the driver, the guidance path determining means 3A of the guidance mode setting portion 3 determines, on the basis of the steering angle of the steering wheel 34, whether or not the vehicle 30 can be guided to the parking completion position P3 by the rearward movement with the steering angle upon sampling and the neutral steering angle. Thus, compared to a case where a great number of guidance paths are calculated, the process is simplified according to the present embodiment. A processing load and a processing time of the ECU 20 may be reduced.

Further, at a time when the final guidance path K3 can be generated while the vehicle 30 is moving forward, the driver is informed thereof, so that the driver simply stops the vehicle 30. Then, the vehicle 30 is guided rearward to the parking completion position P3 by the automatic steering. The vehicle 30 is easily guided to the target parking area G accordingly.

According to the forward turning guidance control, even in a case where the final guidance path K3 cannot be generated while the vehicle is moving forward by the manual steering after being guided rearward along the auxiliary guidance path K1 by the automatic steering, the auxiliary guidance path K1 is again generated by shifting the shift lever 36 to the rearward range (R) by the driver, thereby guiding the vehicle 30 rearward. That is, the forward turning guidance control is performed multiple times so that the vehicle 30 can be guided to the target parking area G into which it is difficult to guide the vehicle 30.

According to the aforementioned embodiment, the target parking position setting portion 2 may recognize the division lines W on the road surface based on the image data captured by the camera 23, and automatically specify a position sandwiched between the two division lines W as the target parking area G. Alternatively, the target parking position setting portion 2 may specify a position of an obstacle in the parking space by using sonar, laser beam, and the like and automatically determine an area where the obstacle is not present as the target parking area G.

The present embodiment may be applicable to the parking assist control in which the control mode for the rearward parking and the control mode for parallel parking are in combination. In addition, the driver may be informed of necessity of multiple number of times of forward turning operations according to the present embodiment.

According to the aforementioned embodiment, even when the target parking area G is not precisely specified or it is impossible to directly guide the vehicle 30 to the target parking area G (target parking position) previously specified, the vehicle is simply guided rearward to a position adjoined to the target parking area G. Thus, a trouble for precisely setting the target parking position, a frustration caused by someone waiting that the present vehicle 30 is parked, and the like may not occur. Even in a case where it is impossible to directly guide the vehicle 30 to the target parking area G, the vehicle 30 is first driven rearward by the automatic steering and then is driven forward by the manual steering of the driver. At that time, the driver is informed that the vehicle 30 reaches a position from which the vehicle 30 is directly guided to the target parking area G. Afterwards, the vehicle 30 is guided to the target parking area G. When the vehicle 30 is driven forward by the manual steering, the vehicle 30 can be driven in a direction while avoiding an obstacle, and the like. Consequently, the parking assist apparatus achieves the forward turning while avoiding an obstacle, and the like when the vehicle 30 is guided to the target parking area G.

According to the aforementioned embodiment, the guidance possibility determining means 5B estimates, while the vehicle 30 is moving forward by the manual steering, a case where the vehicle 30 is guided rearward from a present position of the vehicle 30 with a present steering angle thereof and informing the driver when the estimated case achieves the vehicle 30 to be guided rearward to the target parking area G without once driving the vehicle 30 forward.

In addition, the guidance possibility determining means 5B estimates, while the vehicle 30 is moving forward by the manual steering, a case where the vehicle 30 is guided rearward from a present position of the vehicle 30 with a predetermined steering angle by which the vehicle 30 is driven in a straight line and informing the driver when the estimated case achieves the vehicle 30 to be guided rearward to the target parking area G without once driving the vehicle 30 forward.

The possibility of guiding the vehicle 30 is determined on the basis of two steering angles, i.e., the present steering angle and the steering angle corresponding to the neutral steering angle. When comparing a case where the possibility of guiding the vehicle is determined on the basis of a great number of steering angles, a processing time may be reduced.

According to the aforementioned embodiment, when the vehicle 30 is stopped after the guidance possibility determining means 5B informs the driver, the final guidance controlling means 5C specifies the final guidance path K3 for directly guiding the vehicle 30 rearward to the target parking area G from a position where the vehicle 30 is stopped after the guidance possibility determining means 5B informs the driver and the vehicle 30 is guided rearward along the final guidance path K3 by the automatic steering.

Because the final guidance controlling means 5C controls the vehicle 30 to move rearward along the final guidance path K3 from the stop position after the forward movement, the driver is not required to estimate the path for driving the vehicle 30 rearward, which leads to a reduction of load of the driver.

Further, according to the aforementioned embodiment, when the vehicle 30 moving forward by the manual steering is stopped in a state where the guidance possibility determining means 5B does not inform the driver, the auxiliary guidance controlling means 5A performs the guidance control for driving the vehicle 30 rearward to approach the target parking area G from a position where the vehicle 30 is stopped in the state where the guidance possibility determining means 5B does not inform the driver.

Accordingly, when the vehicle 30 is again driven forward because it is impossible to guide the vehicle 30 to the target parking area G by one forward movement, the vehicle 30 is guided rearward along the auxiliary guidance path K1. That is, after the multiple times of forward turning, the vehicle 30 is eventually guided to the target parking area G.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parking assist apparatus comprising:
a guidance mode setting portion specifying a forward turning guidance controlling portion to perform a control when determining, on a basis of a stop position of a vehicle and a positional relationship with a target parking position previously specified, that a direct guidance control for driving the vehicle rearward to the target parking position without once driving the vehicle forward is unachievable,
the forward turning guidance controlling portion including an auxiliary guidance controlling device performing a guidance control for driving the vehicle rearward from the stop position to approach the target parking position, the auxiliary guidance controlling device generating an auxiliary guidance path for guiding the vehicle to a position adjoined to the target parking position based on the stop position and the target parking position, the auxiliary guidance controlling device driving the vehicle rearward by an automatic steering along the auxiliary guidance path as the guidance control,
the forward turning guidance controlling portion including a guidance possibility determining device determining whether or not the vehicle is directly guided rearward to the target parking position based on a position and a steering angle of the vehicle while the vehicle is moving forward by a manual steering after the vehicle is stopped at the position adjoined to the target parking position, the guidance possibility determining device informing a driver of the vehicle when it is determined that a direct guidance of the vehicle to the target parking position is achievable,
the forward turning guidance controlling portion including a final guidance controlling device guiding the vehicle to the target parking position after the guidance possibility determining device informs the driver.

2. The parking assist apparatus according to claim 1, wherein the guidance possibility determining device estimates, while the vehicle is moving forward by the manual steering, a case where the vehicle is guided rearward from a present position of the vehicle with a present steering angle thereof and informing the driver when the estimated case achieves the vehicle to be guided rearward to the target parking position without once driving the vehicle forward.

3. The parking assist apparatus according to claim 2, wherein the guidance possibility determining device estimates, while the vehicle is moving forward by the manual steering, a case where the vehicle is guided rearward from a present position of the vehicle with a predetermined steering angle by which the vehicle is driven in a straight line and informing the driver when the estimated case achieves the vehicle to be guided rearward to the target parking position without once driving the vehicle forward.

4. The parking assist apparatus according to claim 3, wherein when the vehicle moving forward by the manual steering is stopped in a state where the guidance possibility determining device does not inform the driver, the auxiliary guidance controlling device performs the guidance control for driving the vehicle rearward to approach the target parking position from a position where the vehicle is stopped in the state where the guidance possibility determining device does not inform the driver.

5. The parking assist apparatus according to claim 2, wherein when the vehicle is stopped after the guidance possibility determining device informs the driver, the final guidance controlling device specifies a final guidance path for directly guiding the vehicle rearward to the target parking position from a position where the vehicle is stopped after the guidance possibility determining device informs the driver and the vehicle is guided rearward along the final guidance path by the automatic steering.

6. The parking assist apparatus according to claim 2, wherein when the vehicle moving forward by the manual steering is stopped in a state where the guidance possibility determining device does not inform the driver, the auxiliary guidance controlling device performs the guidance control for driving the vehicle rearward to approach the target parking position from a position where the vehicle is stopped in the state where the guidance possibility determining device does not inform the driver.

7. The parking assist apparatus according to claim 1, wherein when the vehicle is stopped after the guidance possibility determining device informs the driver, the final guidance controlling device specifies a final guidance path for directly guiding the vehicle rearward to the target parking position from a position where the vehicle is stopped after the guidance possibility determining device informs the driver and the vehicle is guided rearward along the final guidance path by the automatic steering.

8. The parking assist apparatus according to claim 1, wherein when the vehicle moving forward by the manual steering is stopped in a state where the guidance possibility determining device does not inform the driver, the auxiliary guidance controlling device performs the guidance control for driving the vehicle rearward to approach the target parking position from a position where the vehicle is stopped in the state where the guidance possibility determining device does not inform the driver.

9. The parking assist apparatus according to claim 1, wherein the guidance possibility determining device estimates, while the vehicle is moving forward by the manual steering, a case where the vehicle is guided rearward from a present position of the vehicle with a predetermined steering angle by which the vehicle is driven in a straight line and informing the driver when the estimated case achieves the vehicle to be guided rearward to the target parking position without once driving the vehicle forward.

10. The parking assist apparatus according to claim 9, wherein when the vehicle is stopped after the guidance possibility determining device informs the driver, the final guidance controlling device specifies a final guidance path for directly guiding the vehicle rearward to the target parking position from a position where the vehicle is stopped after the guidance possibility determining device informs the driver and the vehicle is guided rearward along the final guidance path by the automatic steering.

11. The parking assist apparatus according to claim 9, wherein when the vehicle moving forward by the manual steering is stopped in a state where the guidance possibility determining device does not inform the driver, the auxiliary guidance controlling device performs the guidance control for driving the vehicle rearward to approach the target parking position from a position where the vehicle is stopped in the state where the guidance possibility determining device does not inform the driver.

* * * * *